United States Patent [19]

Scamacca

[11] Patent Number: 5,589,665
[45] Date of Patent: Dec. 31, 1996

[54] CHILD-RESISTANT ELECTRICAL OUTLET COVER

[76] Inventor: Randal Scamacca, 222 Deer Park Ct., Seymour, Ind. 47274

[21] Appl. No.: 254,953

[22] Filed: Jun. 7, 1994

[51] Int. Cl.$^6$ ............................... H02G 3/14; H05K 5/03
[52] U.S. Cl. .......................... 174/67; 174/56; 220/242; 439/147; 439/373
[58] Field of Search ............................... 174/66, 67, 55, 174/56; 220/241, 242; 439/135, 142, 147, 373

[56] References Cited

U.S. PATENT DOCUMENTS

| | | | |
|---|---|---|---|
| 2,716,225 | 8/1955 | McCubbin | 339/75 |
| 2,729,797 | 1/1956 | Kobler et al. | 339/36 |
| 3,363,797 | 1/1968 | Roese | 220/24 |
| 3,428,936 | 2/1969 | Arnao, Jr. | 339/39 |
| 3,656,083 | 4/1972 | Brook | 439/147 |
| 3,955,870 | 5/1976 | Wasserman | 339/39 |
| 4,044,908 | 8/1977 | Dauberger | 220/3.8 |
| 4,045,108 | 8/1977 | Olsen | 439/373 X |
| 4,076,360 | 2/1978 | Singh | 339/36 |
| 4,305,634 | 12/1981 | Lewis | 339/75 R |
| 4,531,800 | 7/1985 | Avener | 439/373 |
| 4,718,856 | 1/1988 | Pinkerton et al. | 439/147 |
| 4,981,439 | 1/1991 | Piedmont | 439/135 |
| 5,102,345 | 4/1992 | Stanwick et al. | 439/181 |

*Primary Examiner*—Kristine L. Kincaid
*Assistant Examiner*—Dean A. Reichard
*Attorney, Agent, or Firm*—Woodard, Emhardt, Naughton, Moriarty & McNett

[57] ABSTRACT

An electrical wall-outlet has a special decorative face plate secured to the socket by a standard retainer screw in the usual manner. Socket surrounding recesses in the face plate have bayonet connector pins in the walls thereof. A longitudinally-halved, cylindrical plug-retainer cup has one bayonet-style connector slot in a wall of one half, and a modified bayonet-style slot and aperture in the opposite half wall thereof. Two narrow elongate slots are provided in the opposite half on each side of the slot and aperture combination forming a cantilever portion of the wall, with the aperture and adjacent slot located adjacent the distal end of the cantilever near the open end of the cup which can be pushed inward by an adult person applying the force properly, and permitting rotation of the retainer cup into position to securely latch the aperture around the pin and secure the cup to the face plate. The cup halves are hinged for mounting on the electrical cord to the plug before or after installation of the plug in the socket, and subsequent advance and attachment of the cup to the face plate, enclosing the plug and preventing its removal from the socket.

13 Claims, 3 Drawing Sheets

CHILD-RESISTANT ELECTRICAL OUTLET COVER

BACKGROUND OF THE INVENTION

1. Field of the Invention

This invention relates generally to devices for prevention of access to electrical outlets by children, and more particularly to a cover useful to protect a child from an open outlet and prevent removal of an electrical plug from an outlet.

2. Description of the Prior Art

Various devices have been invented to prevent children from putting fingers into an electrical outlet (cap 20 in U.S. Pat. No. 4,981,439 issued Jan. 1, 1991 to Piedmont) or to prevent removal of a plug from a socket (U.S. Pat. No. 3,955,870 issued May 11, 1976 to Wasserman), or to do both (U.S. Pat. No. 4,076,360 issued Feb. 28, 1978 to Singh). Other devices have also been invented. There has remained a need for a device which can do both, and is simple in construction and use, and reliable. The present invention is addressed to that need.

SUMMARY OF THE INVENTION

Described briefly, according to a typical embodiment of the present invention, a conventional electrical outlet box with conventional socket assembly installed in it has a special face plate secured to the socket assembly by a conventional retainer screw in the usual manner. The face plate has at least one opening through it in registry with a socket. The face plate has a wall around the opening with guide pins in the wall and recessed with respect to the front face of the plate and projecting inward toward the center of the opening. A plug retainer cup has an open end for reception in the recess between the socket and the front of the face plate and enclosing a plug in the socket. The cup has one bayonet-style connector slot in a wall thereof at the open end, and a modified bayonet-style slot and aperture in the opposite wall thereof. The modified combination slot and aperture are at the open end and located in a portion of the wall which can be pressed inwardly toward the center of the retainer by an adult person applying the force properly, and permitting rotation of the retainer cup into position to securely latch it to the face plate. The cup comprises two semi-cylindrical shells hinged together for easy mounting on the electrical cord before or after installation of the plug in the socket.

DESCRIPTION OF THE PREFERRED EMBODIMENT

Figure 1:
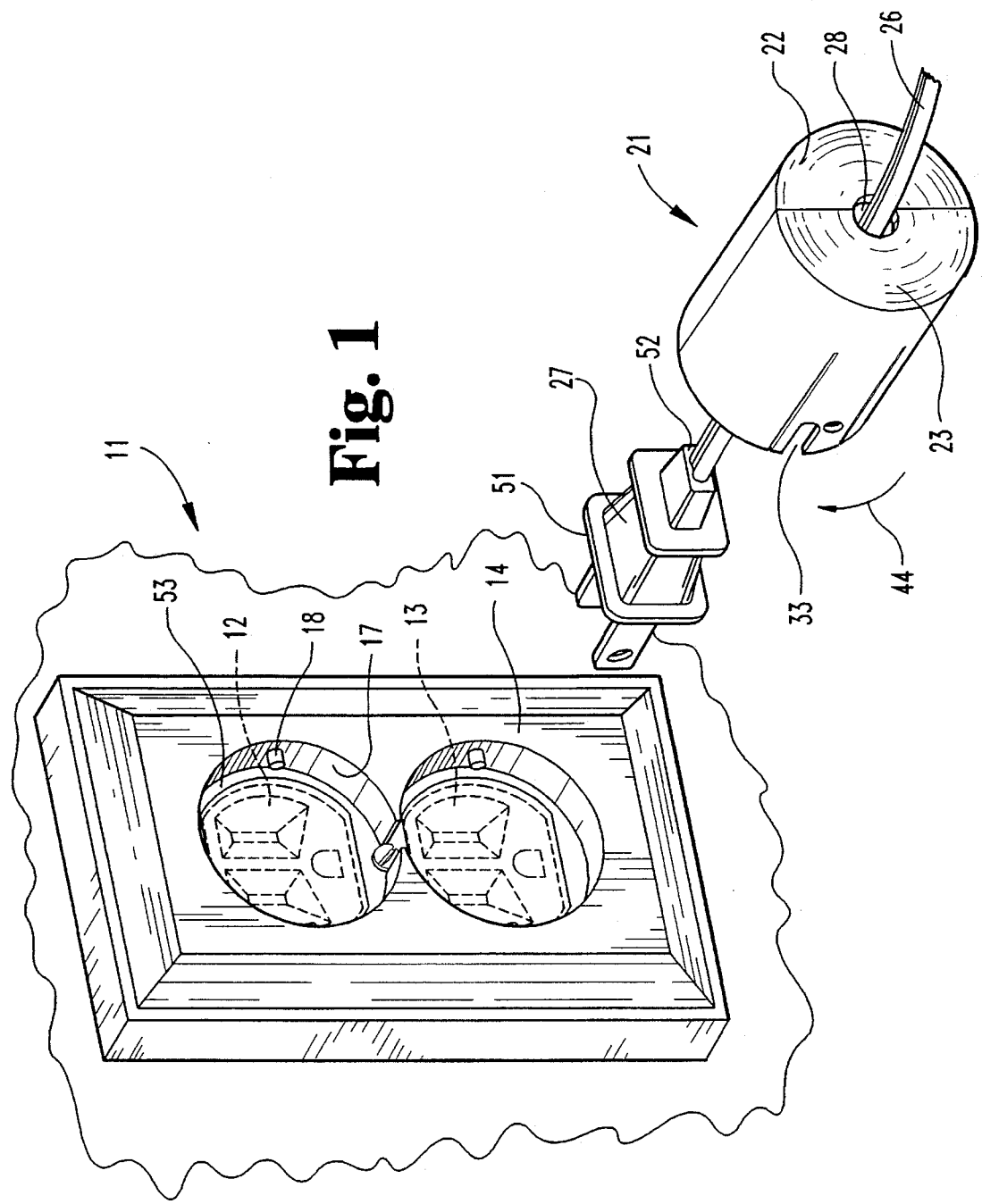
FIG. 1 is a perspective exploded-type view of an electrical wall outlet face plate, electrical plug, and plug retainer, according to a typical embodiment of the present invention but with the wall-mounted socket assembly shown in dashed lines to facilitate the understanding of the drawing.
Figure 2:
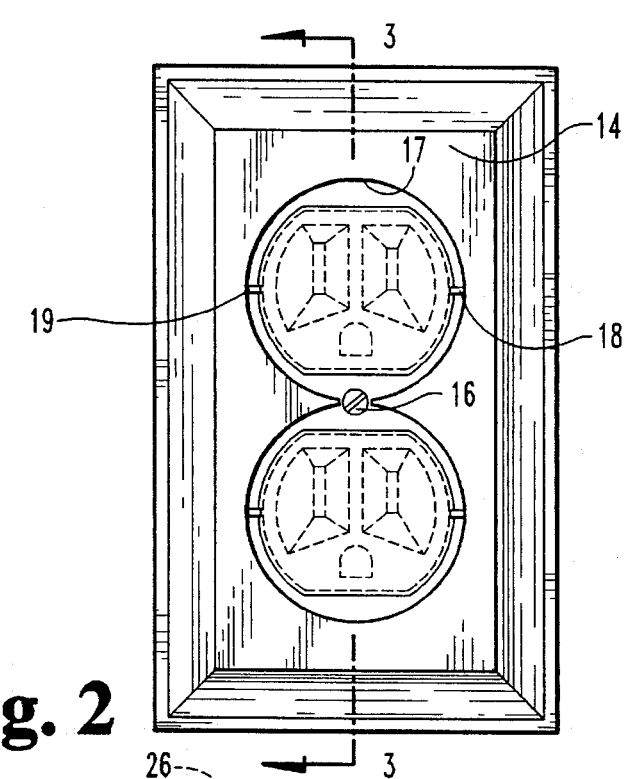
FIG. 2 is a front view of the face plate mounted to the socket assembly, but with the socket assembly shown in dashed lines to facilitate the understanding of the drawing.
Figure 3:
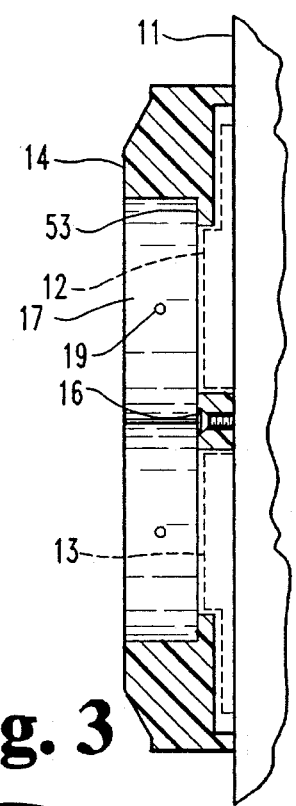
FIG. 3 is a section through the face plate at line 3—3 in FIG. 2 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, there is shown a portion 11 of a building wall having a socket assembly installed therein, two sockets of which 12 and 13 are shown in dotted lines to avoid confusion with features of the present invention. It should be understood that the socket assembly and rough-in box in which it is secured are standard and mounted in the wall in the conventional manner. But instead of a conventional face plate, the face plate 14 of the present invention is provided. It includes a couple of apertures with walls fittingly receiving the bosses of sockets 12 and 13 as in conventional face plates, and is secured to the socket assembly by a mounting screw 16 which can be conventional in size and length. But immediately outboard of the sockets 12 and 13, face plate 14 has recesses such as 17 for socket 12. Both of the recesses function in the same way, so a description of one will suffice for both.

Figure 4:
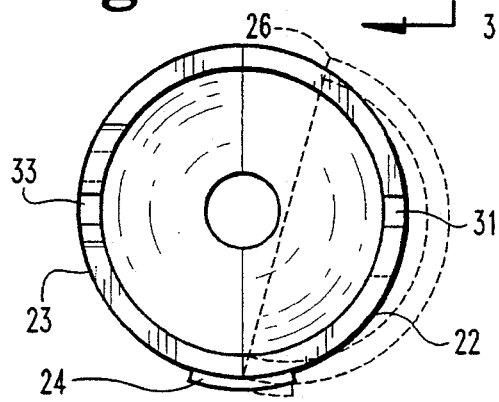
FIG. 4 is an interior axial view of the plug retainer in its relaxed state.

Recess 17 has pins 18 and 19 projecting inwardly from the wall thereof toward the axis of the receptacle at the three o'clock and nine o'clock positions, respectively. These enable a modified bayonet-style mounting for the plug retainer 21. The retainer is in the form of a cup open at one end and substantially closed at the other and comprising two semi-cylindrical shells 22 and 23 having an elongate plastic strip 24 adhered to and extending along the bottom longitudinal margin of each, and serving as a hinge whereby the shells can be separated as indicated by the dotted line 26 in FIG. 4 along their upper margins but remain together at their lower edges. This enables opening them so that an electrical cord/plug assembly including cord 26 with plug 27 at its end can be easily installed in the retainer while a lamp or appliance (not shown) remains attached to the other end. When the retainer is closed, the hole 28 at the closed end closely encircles the cord. If the material of the shells is suitable for it, the hinge may be molded integral with the shells, rather than a distinct plastic strip.

Figure 5:
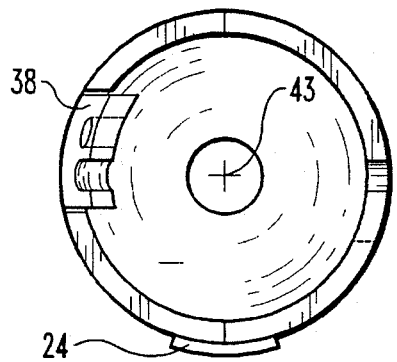
FIG. 5 is an interior axial view of the plug retainer with the wall pushed in to facilitate installation in or removal from the face plate.
Figure 6:
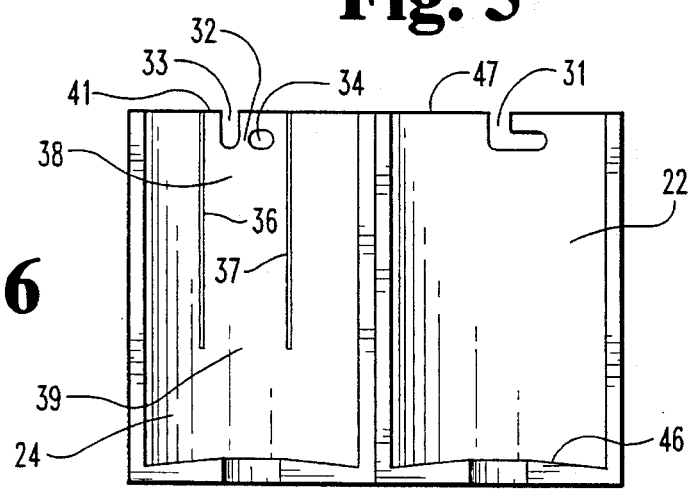
FIG. 6 is a view of the retainer opened up to show the shape of the slots and aperture therein.
Figure 7:
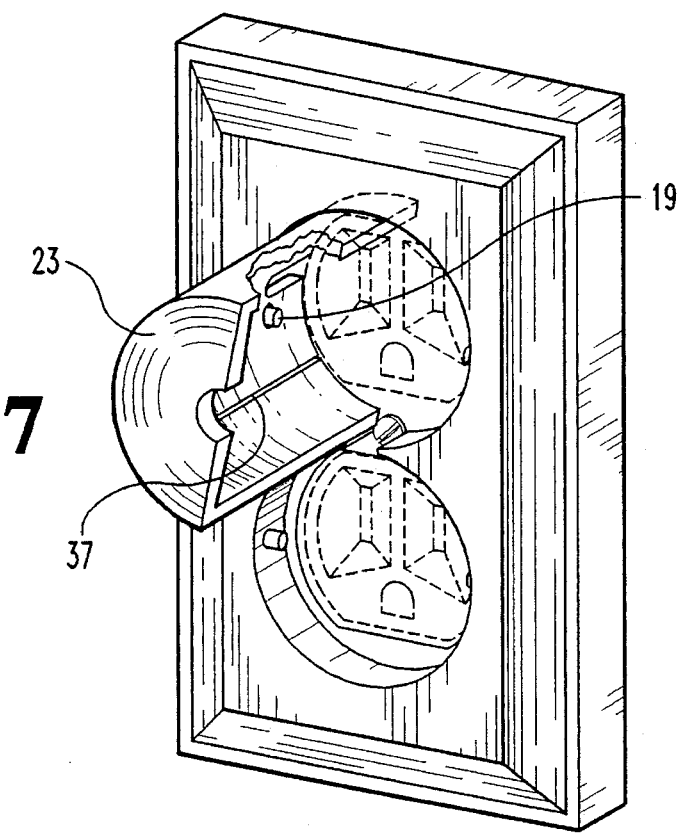
FIG. 7 is a perspective view showing half of the retainer secured in the face plate.
Figure 8:
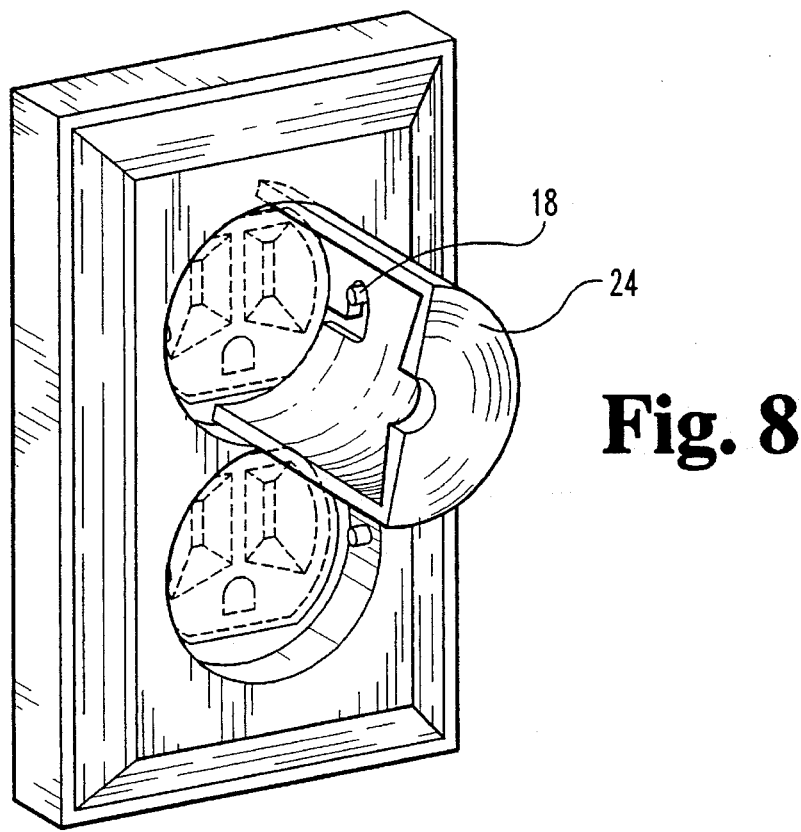
FIG. 8 is a perspective view similar to FIG. 7 but showing the other half of the retainer secured in the face plate.

For attachment of the retainer to the face plate, a modified bayonet-type of connector system is used. In addition to the previously mentioned pins 18 and 19 in the face plate, there is a typical L-shaped bayonet-type slot 31 in the shell 22, the slot entrance being at the open end of the shell. This is shown secured on the pin 18 in FIG. 8. In contrast, shell 24 includes what could be an identical bayonet slot but which is interrupted by a bridge portion 32 between the straight slot 33 and aperture 34. Also, it should be noted that these features 33 and 34 are between a pair of longitudinally extending very narrow slots 36 and 37 cut through the wall of the shell. In effect, therefore, the slot 33 and aperture 34 are at the distal end of a cantilever 38 whose base region 39 is located between one-third and one-half the retainer length from the closed end of the retainer. Therefore, while the retainer is made of a relatively sturdy plastic material, it is possible for an adult to push radially inward in the direction of arrow 42 (FIG. 5) on the distal end portion 41 of the beam toward the axis 43 of the retainer and thus deflect it inwardly as shown in FIG. 5. Therefore, after the plug 27 is inserted in socket 12, retainer 21 can then be moved along the cord into position covering the plug as the open end of the retainer enters recess 17 and the pins 18 and 19 are received in the slots 31 and 33, respectively. When the pins reach the bottoms (closed ends) of these slots, it is not possible to turn the retainer clockwise in the direction of arrow 44 (FIG. 1) because pin 19 will abut the bridge portion 32 between slot 33 and aperture 34. However, upon pushing the cantilever beam end portion 41 inward toward the center, the bridge 32 can be pushed inboard of the inner end of pin 19 whereupon the retainer can be turned clockwise to obtain registry of pin 19 with aperture 34 as the circumferential leg of slot 31 accommodates pin 18. At this time, the beam is released and resiliently springs back to alignment with the rest of the shell wall, and the pin 19 will then lock in aperture 34. With pins 18 and 19 in slot 31 and aperture 34, respectively, and the cylindrical wall 17 of the recess in close but sliding proximity to the outside wall of the cylindrical retainer, a very stable and reliable attachment of the retainer to the face plate is obtained. The length of the circumferential leg of slot 31 is such that the closed end is only slightly farther circumferentially from the axial portion than is aperture 34 from slot 33, so hunting for registry of aperture 34 with pin 19 as the retainer is turned clockwise in the face plate, is avoided.

It is preferable that the depth of the retainer from the closed end 46 thereof to the open end 47 thereof be only slightly greater than the distance between the stop flange 51 of the plug and the cord boss end 52 thereof so that, when the plug is fully inserted in the socket and flange 51 is abutting or proximate to the stop shoulder 53 of the face plate, the closed end 46 of the retainer will be very close to the end 52 of the cord mounting boss of the plug. In this way, even if a child would pull on the cord 26, that would not dislodge the plug from the socket. It is preferable that the wall plate recess be deep enough, and the fit of the cover be snug enough that, even if the two shells were not hinged together or snapped together, they would be held together by the fit in the face plate.

The retainer of the present invention can be made in different depths, if desired, to accommodate different lengths of plugs. Similarly, it can be installed in a socket that does not have any plug in it, and serve simply as a socket cover to keep a child from sticking anything into the socket.

While various materials can be used, the material for the face plate is preferably plastic and can be in any desired color and or decorative finish. Similarly, the material for the retainer is preferably plastic and sturdy enough to secure it on preferably metal pins in the face plate.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An electrical outlet shield apparatus comprising:

a face plate having a front and a back and an opening through the back for reception therein of a socket boss of a wall-mounted electrical socket assembly, the face plate having a recess associated with the opening, the recess having a wall extending outwardly from the opening to the front of the plate;

a pair of anchor pins projecting from the wall of the recess toward the center of the recess;

a covering cup having an open end for reception in the recess, and the cup having a closed end, the cup having a first slot intercepting the open end and a second slot intercepting the open end and an aperture spaced from a closed end of the second slot, the spacing of the slots at the open end corresponding to the spacing of the pins so that the cup can be installed on the pins by advancing the open end of the cup straight into the recess with open ends of the slots in registry with the pins, the cup having a wall portion between the second slot and the aperture and which, by abuttingly engaging one of the pins that is in the second slot, normally prevents turning the cup in the recess, the wall portion being manually deflectable inwardly to clear that wall portion from the abuttingly engaging relationship with the one pin while the cup is in the recess to enable turning the cup to place the aperture in registry with the one pin, the wall portion being resiliently restorable to non-deflected condition for reception of the aperture around the one pin to secure the cup in the recess.

2. The apparatus of claim 1 and further comprising:

a second opening through the back for reception of a second socket boss of the socket assembly; and a central opening between the pair of openings and receiving therethrough a retainer screw securing the face plate to the wall-mounted electrical socket assembly.

3. The apparatus of claim 1 and wherein:

the wall of the recess is cylindrical, the pins are circularly spaced around the wall and located at 3 o'clock and 9 o'clock positions therein.

4. The apparatus of claim 1 and wherein:

the first slot is L-shaped, and the second slot is straight.

5. The apparatus of claim 4 and wherein:

the cup is cylindrical, the first slot has a closed end circularly spaced from the open end intercepting the open end of the cup, the aperture is circularly spaced from the closed end of the second slot in the same direction as the closed end of the first slot is spaced from the open end of the first slot.

6. The apparatus of claim 1 and wherein:

the cup has third and fourth circularly spaced slots opening into the open end of the cup, the second slot and the aperture being located immediately between the third and fourth slots, the third and fourth slots cooperating with a portion of the cup near the closed end of the cup to provide a cantilever beam in which the second slot and the aperture are located near the distal end of the beam, the cup being made of a plastic material such that the deflectable wall portion is deflected by bending the beam to permit turning of the cup in the recess for registry of the aperture with the one pin.

7. The apparatus of claim 1 and wherein:

the cup is made of two shells, the closed end of the cup having a hole therein to receive an electrical cord through the hole.

8. The apparatus of claim 7 and wherein:

the distance between the closed end of the cup and a socket is such as to retain a plug in the socket when the cup is secured in the recess.

9. The apparatus of claim 7 and wherein:

the cup is large enough to fully enclose a plug therein when the cup is secured in the recess.

10. The apparatus of claim 7 and wherein:

the two shells have a longitudinally extending hinge on which they are hinged to open when the cup is apart from the recess to provide transverse access to the hole in the closed end for insertion of an electrical cord into the hole.

11. The apparatus of claim 10 and wherein:

the hinge is a strip of plastic material adhered to marginal portions of each shell adjacent a longitudinal edge of each shell.

12. The apparatus of claim 10 and wherein:

the socket has a central axis, the recess is centered on the axis, the shells are semi-cylindrical, the cup thereby being divided along a plane containing the axis of the socket, and the hole being centered on the axis.

13. A method of preventing removal of an electrical plug from an electrical outlet assembly and comprising the steps of:

opening a two-shell cup;

placing a length of the cord of an electrical plug assembly into the cup, with the cord extending through an opening in a closed end of the cup;

inserting electrical contact prongs of the plug into a socket of the outlet assembly;

inserting an open end of the cup into a recess in a wall plate;

receiving guide pins of the wall plate in slots in the cup;

turning the cup in the recess to lock the cup to the wall plate;

pressing a portion of a wall of the cup at the open end of the cup inward toward the plug prior to turning the cup; and turning the cup until there is registry of an aperture in the wall portion with one of the pins, releasing the pressed-in portion enabling its return to original condition and thereupon encircling the one pin with the aperture.

* * * * *